Aug. 27, 1946.   L. WALTERS   2,406,418
TAPE DISPENSING MACHINE
Filed March 26, 1945   8 Sheets-Sheet 7

Inventor
Lewis Walters
By Kimmel & Crowell
Attorneys

Aug. 27, 1946.  L. WALTERS  2,406,418
TAPE DISPENSING MACHINE
Filed March 26, 1945      8 Sheets-Sheet 8

Inventor
Lewis Walters
By Kimmel & Crowell
Attorneys

Patented Aug. 27, 1946

2,406,418

UNITED STATES PATENT OFFICE 2,406,418

TAPE DISPENSING MACHINE

Lewis Walters, New York, N. Y.

Application March 26, 1945, Serial No. 584,842

11 Claims. (Cl. 164—49)

This invention relates to tape dispensing machines and is an improvement over my prior Patents Numbers 2,175,959 issued October 10, 1939, 2,209,266 issued July 3, 1940, 2,213,908 issued September 3, 1940, and 2,245,472 issued June 10, 1941, and is a continuation in part of my copending application, Serial No. 527,241, filed March 20, 1944, for Tape dispensing machine.

An object of this invention is to provide a moistened tape dispensing machine which is designed for dispensing wide tape and which is so constructed that tapes of varying widths up to the maximum may be dispensed by this machine.

Another object of this invention is to provide in a machine of this type, an improved cutter or knife for severing a measured length of tape.

A further object of this invention is to provide an improved means for regulating the length of the dispensed tape.

A further object of this invention is to provide in a machine of this type an improved means for maintaining the tape in contact with the moistening element.

A further object of this invention is to provide in a machine of this type, an improved guide for guiding the tape from the supply roll to the cutter.

A further object of this invention is to provide in a machine of this type an improved means for actuating the cutter on the return or idling stroke of the operating lever, so that the cutter will be properly actuated for any selected length of tape dispensed.

A further object of this invention is to provide an improved means for supporting the supply roll so that tapes of varying widths may be dispensed.

With the above objects in view, and others which may hereinafter more fully appear, the invention consists of the novel construction, combination and arrangement of parts as will be more specifically referred to and illustrated in the accompanying drawings wherein is shown an embodiment of the invention, but it will be understood that changes, modifications and variations of the invention may be resorted to which fall within the scope of the invention as claimed.

Referring to the drawings the numeral 20 designates generally a housing which is formed of opposite side walls 21 and 22 connected together at the rear thereof by a rear wall 23. The rear wall 23 is formed with a tube 24 through which a securing bolt 25 is adapted to engage, the bolt 25 also engaging through the opposite side walls 21 and 22. The end wall 23 is continued downwardly and forwardly, as indicated at 26, and the bottom wall 26 is bent upwardly at its forward end, as indicated at 27, and secured between the side walls 21 and 22 by fastening members 28 secured to inwardly projecting lugs 29 carried by the inner sides of the side walls 21 and 22.

The end wall 23, bottom wall 26 and upwardly inclined wall 27 define a supply roll chamber 30 within which a gummed tape supply roll 31 is adapted to engage.

The roll 31 rotatably engages on a pair of rollers 32 and 33 which are mounted on bolts 34 and 35 respectively, extending between the side walls and preferably spacer sleeves 36 and 37 are disposed about the bolts 34 and 35 and engage the inner faces of the side walls 21 and 22 so as to hold these side walls in desired spaced apart relation. Preferably roller 33, which is a lower forward roller, includes a pair of outer rollers 38 and 39 of less diameter than the intermediate roller 39a. A bolt 40 extends between the side walls 21 and 22 at the forward end of a roll chamber 30 and has mounted thereabout a spacer sleeve 41, and a plurality of rollers 42, 43 and 44 are disposed about the spacer sleeve 41. There are two short rollers 43 at each end of intermediate roller 42 and there is one outer roller 44 on the outer side of each roller 43. In order to provide a means whereby supply rolls of different widths may be rotatably held in upstanding position within the roll chamber 30, I have provided a pair of plates 45 and 46 which have bosses 47 and 48 respectively at their lower end portions. The plates 45 and 46 are elongated and are loosely supported on a transversely extending bolt 49 extending between the side walls 21 and 22 at the lower rear portion of the roll chamber 30.

The bosses 47 and 48 are adapted to slide lengthwise of the bolt 49 and the plates 45 and 46, at their upper forward ends, are each formed with a slot 50 within which the bolt 40 and the sleeve 41 are adapted to loosely engage. The forward upper ends of the plates 45 and 46 may be disposed at opposite ends of the intermediate roller 42 and between this roller and the next adjacent rollers 43 and if desired these plates may be disposed between the short rollers 43 and 44 or may be positioned at the outer ends of the rollers 44.

A tape guiding table, generally designated as 51, is disposed forwardly of the roll chamber 30, and extends forwardly and downwardly therefrom. The guiding table 51 includes a flat plate 52 extending between the side walls of the housing which is formed at the opposite longitudinal edges thereof with vertical flanges 53 forming a channel therebetween and horizontal outwardly extending flanges 54 extend from the upper edges of the vertical flanges 53 and seat on lugs 55 which are carried by the inner sides of the side walls of the housing and the flanges 54 are secured on the lugs 55 by fastening members 56. The table 51 provides an additional means for holding the side walls of the housing in spaced apart parallel relation.

A plate 57 is disposed within the channel formed by the vertical flanges 53 of the table, and has the lower side thereof positioned in spaced relation to the upper side of the plate 52 so as to thereby form a passageway 58 within which the tape is adapted to slidingly engage. The plate 57 has a transversely disposed rib 59 extending upwardly therefrom and the rib 59 is formed with plate supporting lugs 60 at the opposite ends thereof which loosely engage in cutouts or recesses 61 formed in the horizontal flange 54 and the vertical flange 53. The lower edge 62 of the cutout or opening forms a stop to limit the downward movement of the plate 57. The rear portion of the plate 57 has formed integral therewith, a pair of outwardly extending supporting lugs 63 which engage over the upper sides of the flanges 54.

The forward tape guiding table 64 secured by fastening members 65 to inwardly projecting lugs 66 carried by the side walls, is disposed in a horizontal position extending from the forward lower end of the table 51. The rear edge or end of the table 64 is spaced forwardly from the forward end of the table 51, and forms a space 67 within which a tape cutting blade 68 is adapted to slidingly engage. A rockable presser plate 69 formed with a tubular rear portion 70 is mounted on a transversely extending bolt or shaft 71 extending between the side walls of the housing and overlies the horizontal table 64. The tubular rear portion 70 of the presser plate 69 forms a tape guiding mouth or throat 72 within which the free end of the tape is adapted to engage as it is pushed forwardly.

The plate 69 is relatively light in weight so as not to cause undue friction on the forwardly moving tape and cause the tape to buckle at the forward end of the plate 57. A second presser plate, generally designated as 73, is rockably mounted on a bolt or pivot member 74 extending between the side walls of the housing. The presser plate 73 includes a plate member 75 formed with a tubular rear end portion 76, which is transversely elongated so that the rear end of the presser plate may have relative vertical movement with respect to pivot member 74.

Figure 9:
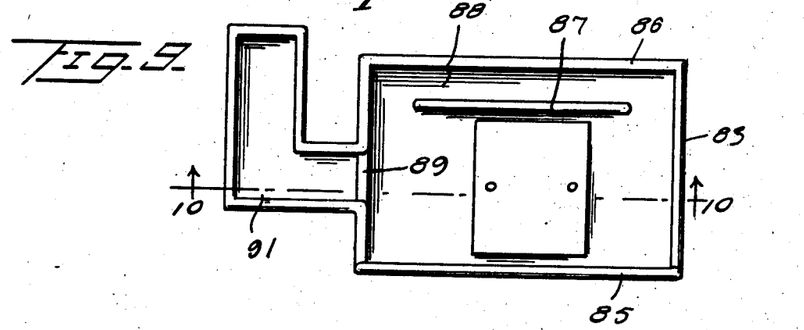
Figure 9 is a top plan of the water receptacle and brush holder.
Figure 10:
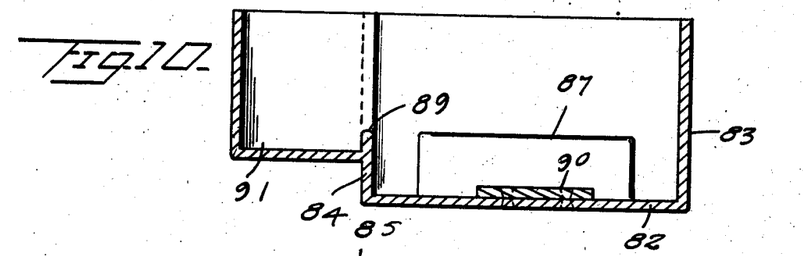
Figure 10 is a sectional view taken on the line 10—10 of Figure 9.
Figure 11:
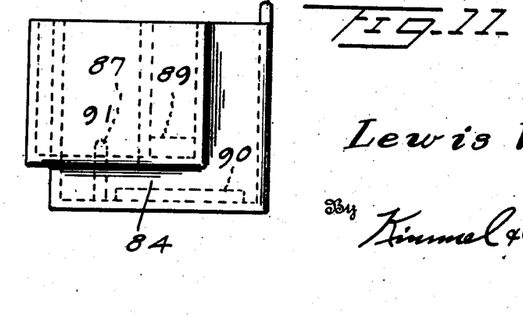
Figure 11 is a detail end elevation of the water and brush holder.
Figures 12, 16:
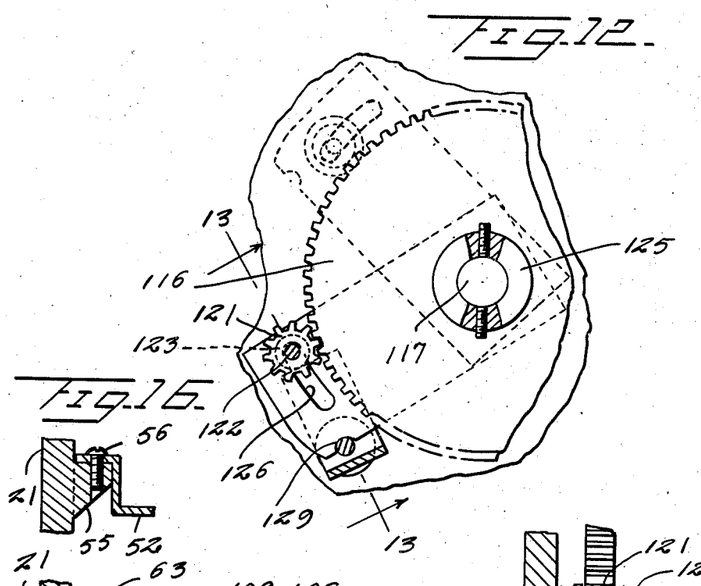
Figure 12 is a fragmentary side elevation, partly in section, of the feeding mechanism.
Figure 16 is a fragmentary sectional view taken on the line 16—16 of Figure 2.
Figures 13, 14, 15:
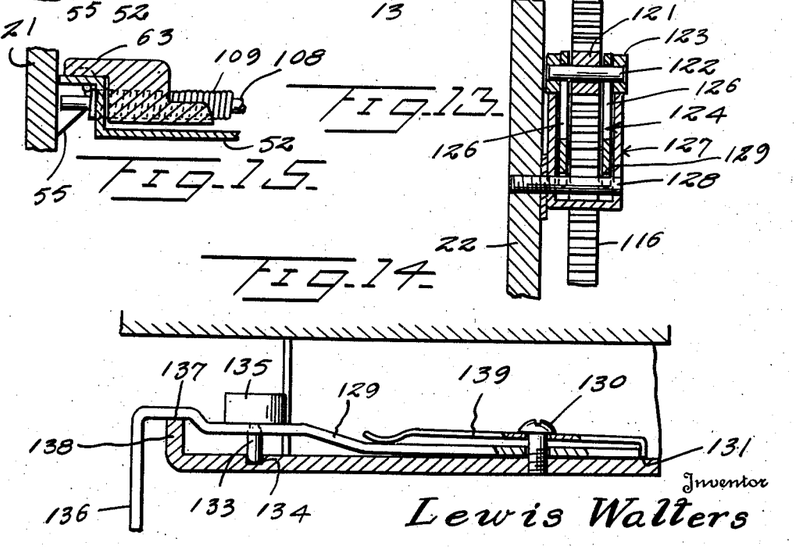
Figure 13 is a fragmentary sectional view taken on the line 13—13 of Figure 12.
Figure 14 is a sectional view taken on the line 14—14 of Figure 1.
Figure 15 is a fragmentary sectional view taken on the line 15—15 of Figure 2.

The forward portion of the plate 75 is reverted or bent back upon itself so as to form a transversely extending housing 77 within which a weight 78 is adapted to be positioned. The weight 78 is adapted to overlie a pair of tape moistening brushes 79 and 80 which are mounted in a brush holder, generally designated as 81. The brushes 79 and 80 project slightly above the top of table 64 at the forward end of the latter so that the lower gummed side of the tape will brush over these brushes and will become moistened thereby. The brush holder 80, shown in Figures 9, 10 and 11, includes a box-like housing formed of a bottom wall 82, opposite side walls 83 and 84 and front and rear walls 85 and 86. An upstanding rib 87 is mounted in the holder 81 forwardly from the rear wall 86 and provides a water channel or passage 88 so that the water entering intake opening 89 which is formed in the side wall 84, may engage at the opposite edges of the brushes disposed in the holder 81, forwardly from the partition or rib 87. The plate 90 is secured to the inner side of the bottom wall 82 and provides a means whereby the brushes 79 and 80 may be raised to the desired degree for engagement with the gummed lower side of the tape. A water reservoir 91, of substantially L-shape in plan, extends from the side wall 84 and communicates with the interior of the brush holder through the opening 89 in the side wall 84. A bottle or liquid receptable 92 is supported from the outer side of a gear housing 93, secured to the side wall 21. The receptacle 92 is seated in a transversely curved plate 94, having a lower forward end 95 against which the lower forward end of the receptacle 92 is adapted to seat and the plate 94 has formed integral therewith a supporting plate or bracket 96 having a curved slot 97 therein through which a bracket adjusting bolt 98, threaded into a gear housing 93, is adapted to engage.

A second bolt or screw 99 also engages through the bracket 96 forwardly from the slot 97 and about which the receptacle holder is adapted to pivot when adjusted by loosening of bolt 98. The receptacle 92 has extending from the forward lower end thereof, a tube 100 and a flexible tube 101 is telescoped over the tube 100 and projects into the reservoir 91.

The tape T, which is withdrawn from the supply roll 31, is fed forwardly by means of a serrated feeding roller 102 which is secured to a shaft 103 journalled between the side walls 21 and 22. The feeding roller 102 extends through an opening 104 formed in the center of the table member 52 so that the roller 102 will engage the lower side of the tape. A pressure roller 105, which is mounted on a shaft 106, carried by a U-shaped roller support 107, is disposed above the table member 52 and is adapted to engage the upper side of the tape T directly above the roller 102. The roller mounting 107 is rockably mounted on a shaft 108 extending between the vertical flanges 53 of the table 51 and a spring which is formed of a pair of coils 109 and 110 having an intermediate U-shaped roller tensioning member 111, is disposed about the shaft or bolt 108 and constantly urges the roller 105 downwardly into tape contacting position. The outer ends of the coil springs 109 and 110 extend through the vertical flanges 53 and terminate in a lateral extension engaging the lower side of the horizontal flanges 54. The shaft 103 has secured thereto a gear 112 which meshes a gear 113 mounted on a shaft 114 journalled between the side walls of the housing. The shaft 114 has secured thereto a small gear 115 meshing with a driving gear 116 loosely carried by a drive shaft 117.

The gears 115 and 116 are disposed in the gear housing 93 formed with ears 118 and secured by fastening members 119 to the side wall 21 of the housing. The shaft 117 has secured to the end thereof opposite from gear 116 and outwardly of side wall 22, a lever 120 having a handle 121 projecting inwardly over the housing 20.

In order to provide for rotation of shaft 114 with rocking of shaft 117, I have provided a small gear 121, which is loosely mounted on a shaft 122 having collars 123 at the opposite ends thereof. The shaft 122 extends between the parallel arms 124 and a U-shaped support which is fixedly mounted on shaft 117 by means of a collar 125. The parallel sides of the supporting member 124 are formed with elongated arcuate slots 126 which are eccentric with respect to the axis of shaft 117 so that when the roller support or mounting 124 moves upwardly with rotation of shaft 117 shaft 122 will initially remain stationary until gear 121 is tightly clamped against gear 116 after which gear 116 will rotate with gear holder 124. This gear holder with gear 121 constitutes a ratchet which is so constructed as to provide an initial lost motion with respect to gear 115, the purpose for which will be hereinafter described.

In order to provide for positive release of gear 121 from gear 116 on the return cycle of lever 120, I have provided a U-shaped gear releasing member 127 which is secured by fastening means 128 to the side wall 22. The collars 123 are adapted to engage the upper ends of the free legs of the U-shaped member 127 and hold the gear 121 and shaft 122 stationary while ratchet supporting member 124 swings downwardly for the remainder of its return cycle. The lower edges of the side legs of ratchet supporting member 124 are notched out as at 129 so as to permit sufficient movement of the ratchet supporting member during the release of ratchet gear 121 from locking with gear 116.

The forward rocking of lever 120 may be selectively limited by means of an adjustable locking lever 129 mounted on a pivot member 130 engaging through the outer wall 131 of a lever housing 132.

The adjusting lever 129 is provided with a stop pin 133 which is engageable in a selected one of a plurality of recesses or pin sockets 134 formed in the inner side of the wall 130. A lever stop member 135 is carried by lever 129 and is positioned in the path of the swinging of lever 120 so that the latter lever will be limited in its forward rocking according to the position of the member 135.

Lever 129 is formed with a right angularly and outwardly extending arm 136 engaging through an opening 137 formed in the side wall 138 so that lever 129 may be selectively adjusted to the desired position. A flat spring 139 loosely engaging about pivot member 130 constantly urges lever 129 outwardly so as to maintain pin 133 in the selected recess 134. Housing 132 is formed with at least a pair of ears 139a which are secured by fastening members 140 to the under side of side wall 22. A lever returning spring 141 which is secured at one end to an eye 142 carried by lever 120 and the spring 141 engages over a roller 143 carried by a pivot member 144 disposed in the lever housing 132 and the opposite end of spring 141 is secured to a screw 145 carried by the side wall 22. Lever 120, upon rearward swinging thereof is adapted to engage a cushioned stop member 146 carried by a lug 147 which is disposed within the lever housing 132.

Figure 1:
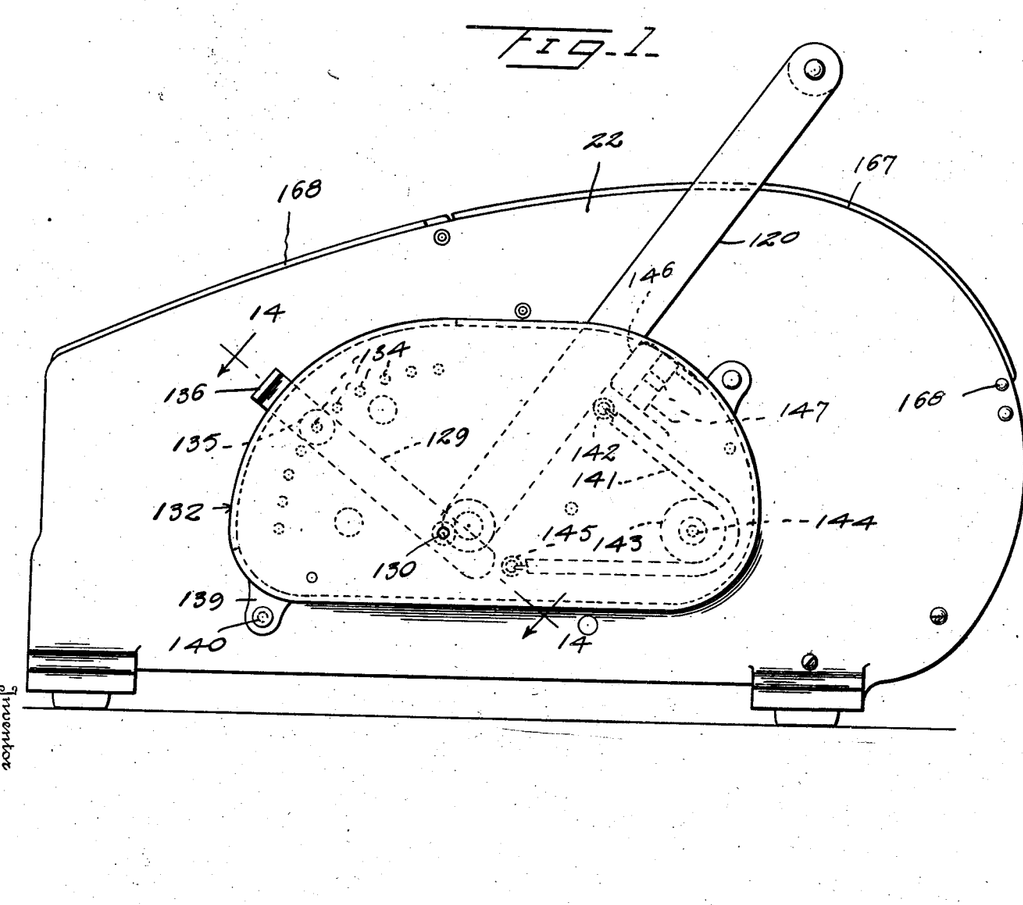
Figure 1 is a detail side elevation of a tape dispensing machine constructed according to an embodiment of this invention.
Figure 2:
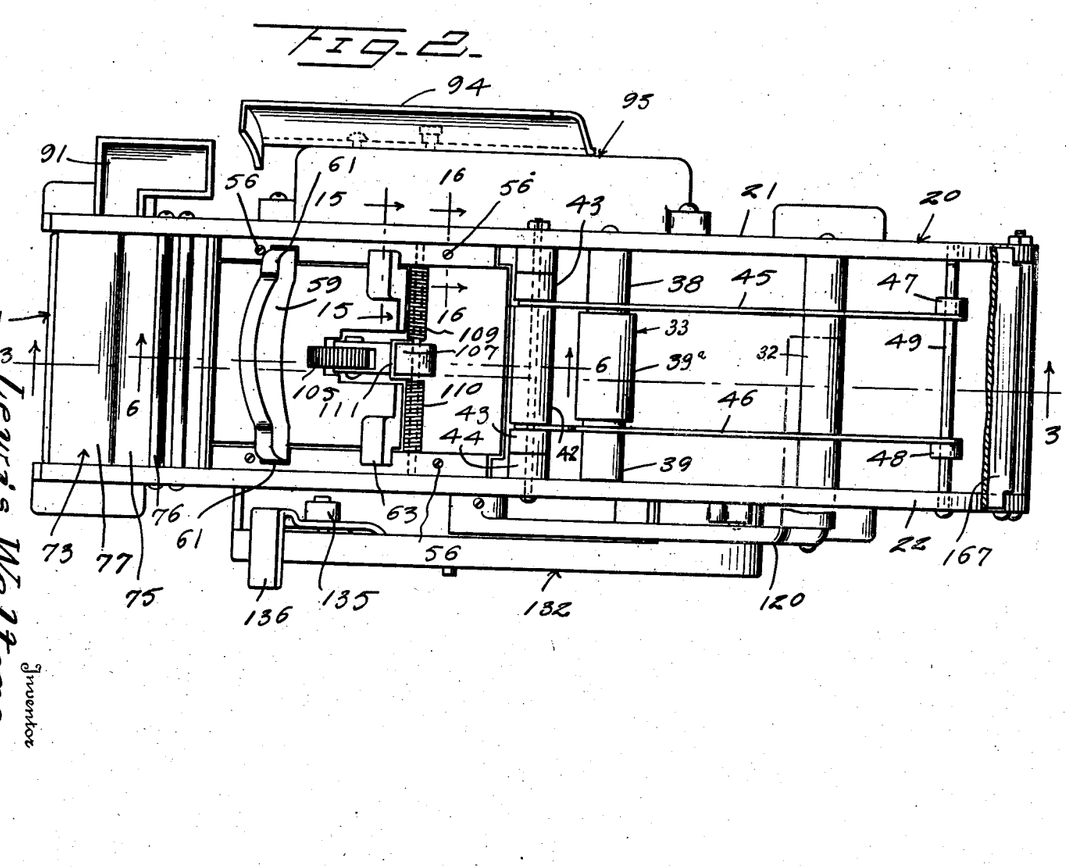
Figure 2 is a detail top plan of the machine.
Figure 3:
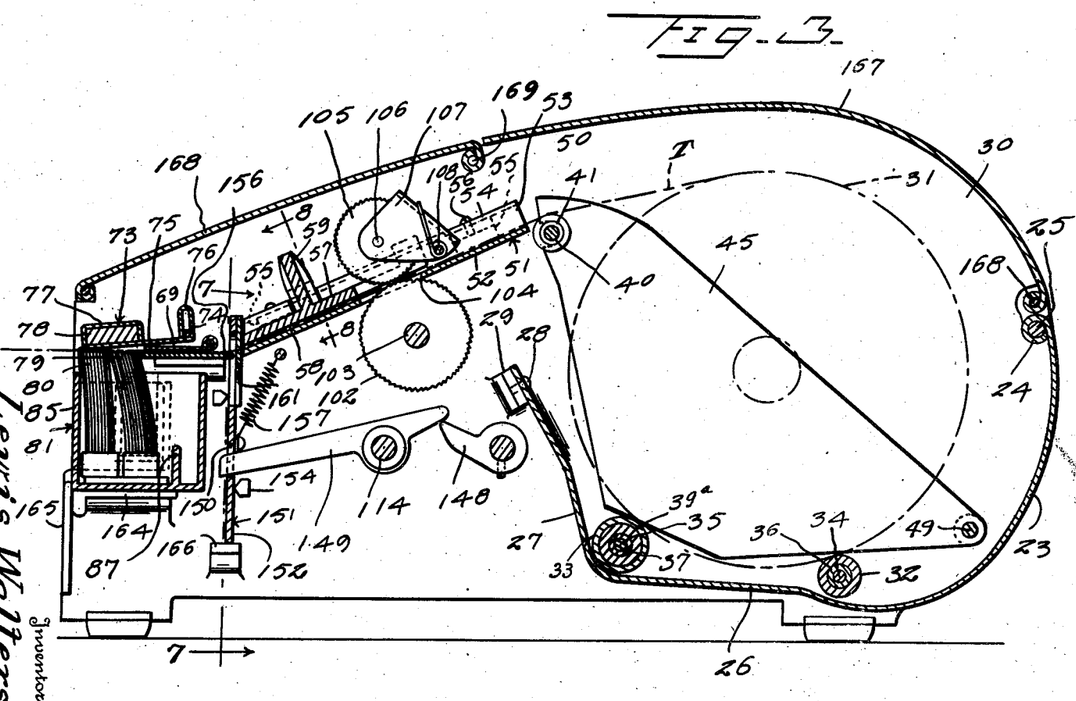
Figure 3 is a longitudinal sectional view taken substantially on the line 3—3 of Figure 2.
Figure 4:
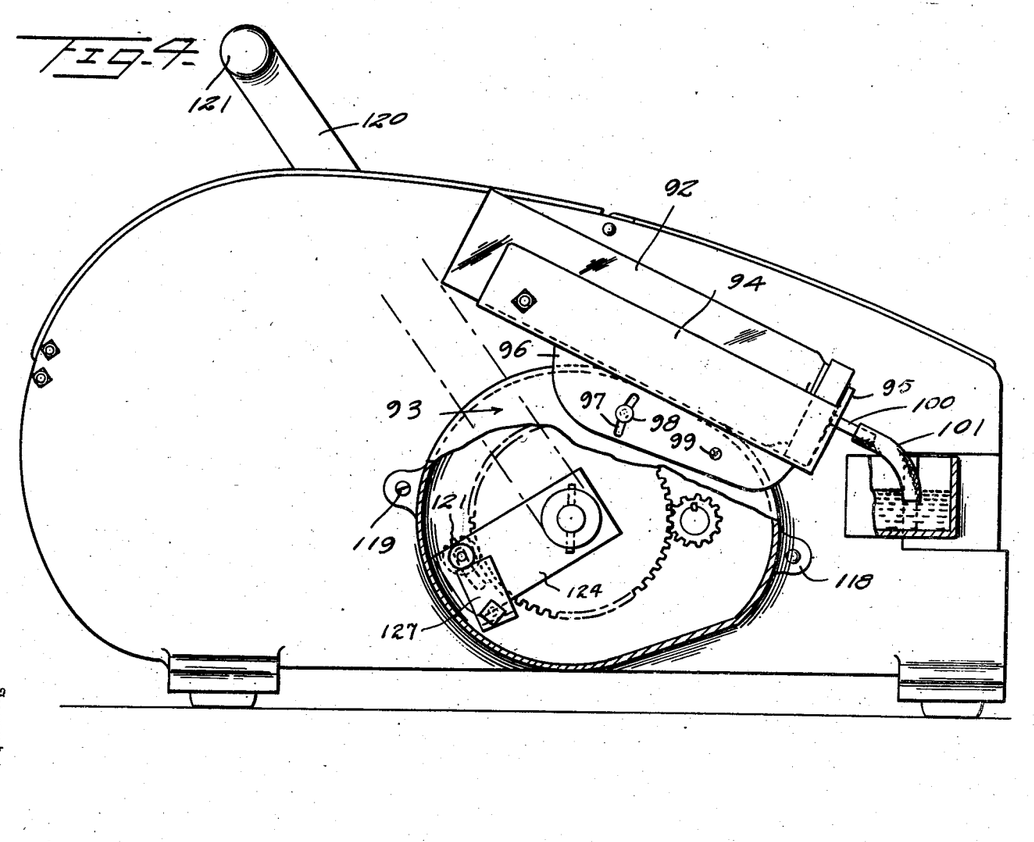
Figure 4 is a detail side elevation of the side of the machine opposite from that shown in Figure 1, with a portion of the device broken away and in section.

The shaft 117 has secured thereto between the side walls 21 and 22 thereof, a blade shifting dog 148 and the dog 148 is adapted to engage the rear end of a blade shifting lever 149 which is rockably mounted on shaft 114. The rear end of lever 149 projects rearwardly from shaft 114, and the forward or long end thereof projects forwardly into an opening 150 which is formed in a blade carrier 151. The blade carrier 151 comprises a plate 152 having a blade exposing opening 153 and the plate 152 is slidable between a pair of spaced apart plate guiding lugs 154 and 155 which are carried by the inner sides of the side walls 21 and 22. The plate 153 is also adapted to slidingly engage between the adjacent ends of the table members 52 and 64 and preferably table 64 is formed with a rearwardly projecting portion 156 which engages in the opening 153. The plate carrier 151 is constantly urged upwardly by means of a pair of springs 157 secured at their lower ends to bolts 158 carried by the plate 152 and to bolts or pins 159 carried by the side walls of the housing. Blade 68 is secured to the rear side of plate 152 by fastening members 160 in the form of rivets or the like and blade 68 is of inverted V-shape, as indicated at 161 so as to provide a shearing effect or action when blade 68 is pulled downwardly by rocking of lever 149 under the upward rocking of lever rocking dog 148. The stop member 156 will engage the lower edge of opening 153 when lever 149 has been released from dog 148 by counter-clockwise rocking or rotation of this dog as viewed in Figure 3, so that blade carrier 151 may be moved upwardly by means of springs 157 and permit the tape to be moved forwardly between the knife edge 161 of blade 68 and the lower edge 163 of opening 153.

Figure 5:
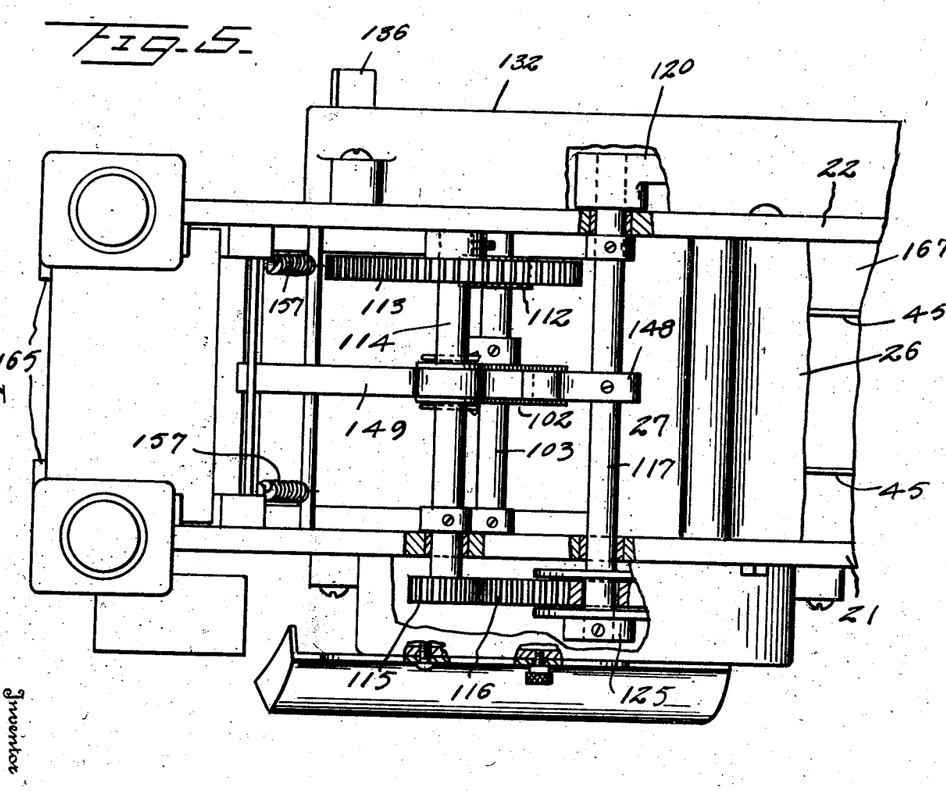
Figure 5 is a fragmentary enlarged bottom plan, partly broken away and in section.
Figure 6:
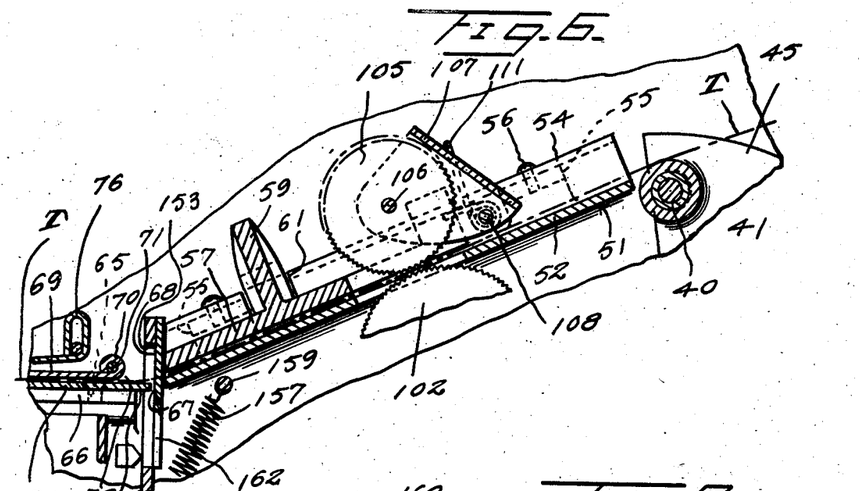
Figure 6 is an enlarged fragmentary sectional view taken on the line 6—6 of Figure 2.

The brush holder 81 is supported forwardly of the blade carrier 151 by means of inwardly projecting supporting lugs 164 carried by the side walls of the housing, and preferably right angular flanges 165 are formed integral with the forward ends of the side walls and are disposed in spaced apart relation, as shown more clearly in Figure 5.

Figure 7:
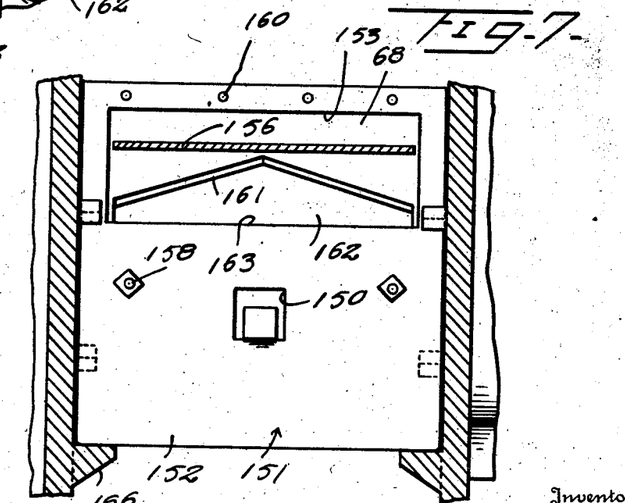
Figure 7 is a fragmentary sectional view taken on the line 7—7 of Figure 3.
Figure 8:
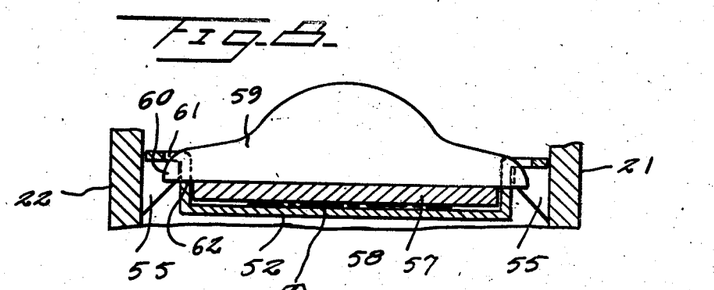
Figure 8 is a fragmentary sectional view taken on the line 8—8 of Figure 3.

The blade carrier 151 is limited in its downward movement by means of a pair of inwardly projecting lugs 166 carried by the side walls of the housing, as shown in Figure 7. At the time the carrier 151 is in its lowermost position the blade 68 intersects the table 51 at the forward end thereof so that the tape T cannot be pulled forwardly until lever 120 is initially rocked forwardly on the initial lost motion thereof with respect to the tape feeding gear train.

A swingable cover plate 167 is rockably mounted on a pivoting bolt 168 carried by the side walls and engages over the supply roll chamber 130. A second closure 168 is rockably mounted on a pivot bolt 169 extending between the side walls and the free end of closure member 168 terminates at the forward end of the housing whereas the rear end of closure 168 terminates at substantially the forward end of closure 167.

In the use and operation of this device the supply roll is disposed in roll chamber 30 engaging on rollers 32 and 33 with plates 45 and 46 adjusted to loosely support the supply roll 31 within the chamber 30. The tape T is taken from the top of roll 31 and moved forwardly over table 51 between feed rollers 102 and 105, and in the guiding space 58 beneath the plate 57. As lever 120 is rocked forwardly in the initial forward rocking of this lever, ratchet gear 121 will initially rotate on shaft 122 until this shaft is tightly bound by the eccentric slot 126 and gear 121 thus locked to driving gear 116. When knife operating dog 148 is rotated downwardly away from the rear end of plate operating lever 149 springs 157 will move plate carrier 151 upwardly and when plate carrier 151 is in its uppermost position the tape can be pushed forwardly in the space 162 and the tape will then enter the guiding throat 72 and pass beneath the lightweight pressure plate 69 and will then be pushed between the brushes 79 and 80 and a pivoted pressure plate 73.

The extent of the forward rocking of lever 120 is limited by the adjustment of stop lever 129 so that the length of dispensed tape can be very accurately guaged.

This tape dispensing machine has been designed particularly for dispensing relatively wide tape and, as hereinbefore described, the width of the tape is only limited by the width of the channel formed between the table flanges 53. Any desired narrow width of tape may be dispensed, it only being necessary to adjust the supply roll supporting plates 45 and 46 between the selected rollers 42, 43 or 44.

What is claimed is:

1. In a tape dispensing machine including a housing formed with a supply roll chamber, a pair of roll supporting rollers in the lower portion of said chamber, a pair of vertical roll supporting plates in said chamber, a stationary shaft extending transversely across said chamber and loosely extending through said plates whereby said plates may be selectively spaced from each other, a plurality of rollers at the upper forward portion of said chamber, means supporting said latter rollers, said plates being notched at their forward ends to engage over said latter supporting means, and said plates being engageable between selected ones of said latter rollers whereby said plates will be held in spaced parallel relation.

2. In a tape dispensing machine, a tape guiding table, including a pair of table members having their adjacent ends disposed in spaced relation, a knife carrier slidable in the space between said table members and having an upper elongated opening within which one of said table members projects whereby said one table member will limit the vertical movement of said carrier in at least one direction, a knife secured to said carrier and having an inverted V-shaped cutting edge, spring means constantly urging said carrier upwardly to inoperative position whereby the tape may be fed through the opening in said carrier, and means for moving said carrier downwardly on the cutting cycle thereof.

3. In a tape dispensing machine as set forth in claim 2, wherein said last named means includes a rock lever engageable at one end thereof with said carrier, and a lever operating dog engageable with the opposite end of said lever.

4. In a tape dispensing machine, a housing formed with a supply roll chamber, a plurality of roll supporting rollers in said chamber, one of said rollers being formed of a plurality of axially aligned roller sections, and a pair of supply roll guiding plates in said chamber, each of said plates having an end thereof interposed between a pair of said roller sections whereby rolls of different widths may be supported on said rollers.

5. A tape dispensing machine comprising a housing, a tape guiding table in said housing, a pair of tape feeding rollers for moving the tape lengthwise of said table, a gear train connected with one of said rollers, a drive shaft for said gear train, an operating lever fixed to said shaft, pawl and ratchet means for operating said gear train upon rotation of said shaft in one direction, a loose coupling between said shaft and said ratchet providing lost motion between said shaft and said ratchet, a tape cutter, means mounting said cutter for sliding movement across said table, a carrier fixed to said cutter, means constantly urging said cutter to a position above said table, a cutter depressing lever disposed below said table and engageable with said carrier, and a trigger fixed to said shaft engageable with said depressing lever when said operating lever is in a substantially rearmost position to thereby move said cutter downwardly to cutting position, said loose coupling providing means whereby said cutter will be moved upwardly above said table by said latter means prior to rotation of said feeding rollers by said gear train.

6. A tape dispensing machine as set forth in claim 5 including a stop carried by said housing engageable with said carrier for limiting the upward movement of said cutter.

7. In a tape dispensing machine, a tape guiding table of U-shape in transverse section, outwardly extending supporting flanges carried by the opposite legs of said table, a passage forming plate disposed between the legs of said table and having the lower side thereof spaced from the upper surface of said table, and outwardly extending supporting lugs carried by said plate engaging said flanges to thereby support said plate spaced from said table, said flanges and said legs being formed with a pair of cutouts within which certain of said lugs engage for holding said plate against endwise movement.

8. In a tape dispensing machine, a feeding means for the tape comprising a rock shaft, a lever secured to said shaft, a driving gear loose on said shaft, a ratchet gear meshing with said driving gear, a carrier for said ratchet gear fixed on said shaft, and means mounting said ratchet gear on said carrier whereby said ratchet gear will be immovable relative to said driving gear during the rotation of said shaft in one direction, said carrier including a pair of plates fixed to said shaft on opposite sides of said driving gear and formed with eccentrically disposed curved slots, and a shaft loosely extending through said slots and said ratchet gear.

9. In a tape dispensing machine, a feeding means for the tape comprising a rock shaft, a lever secured to said shaft, a driving gear loose on said shaft, a ratchet gear meshing with said driving gear, a carrier for said ratchet gear fixed on said shaft, and means mounting said ratchet gear on said carrier whereby said ratchet gear will be immovable relative to said driving gear during the rotation of said shaft in one direction, said carrier including a pair of plates fixed to said shaft on opposite sides of said driving gear and formed with a pair of eccentrically disposed curved slots, a shaft loosely extending through said slots and said ratchet gear, a pair of collars on said latter shaft, and stationary means disposed in the path of swinging of said ratchet gear engageable with said collars for effecting positive release of said latter shaft from said carrier prior to the completion of the return cycle of said first shaft and for effecting an initial lost motion between said first shaft and said driving gear.

10. In a tape dispensing machine, a housing, a feeding lever rockably carried by said housing, a cap-shaped cover carried by one side of said housing engaging about a portion of said lever and having a slot in which said lever may freely rock, an abutment fixedly carried by said cover for limiting the rearward rocking of said lever, a forward stop disposed in the path of the forward rocking of said lever, and means adjustably mounting said forward stop whereby to regulate the feeding cycle of said lever, said mounting means including a stop carrier swingably carried by said cover, said cover having a plurality of recesses on the inner side thereof, and a pin carried by said carrier engageable in a selected recess.

11. In a tape dispensing machine, a housing, a feeding lever rockably carried by said housing, a cap-shaped cover carried by one side of said housing engaging about a portion of said lever and having a slot in which said lever may freely rock, an abutment fixedly carried by said cover for limiting the rearward rocking of said lever, a forward stop disposed in the path of the forward rocking of said lever, and means adjustably mounting said forward stop whereby to regulate the feeding cycle of said lever, said mounting means including a stop carrier swingably carried by said cover, said cover having a plurality of recesses on the inner side thereof, a pin carried by said carrier engageable in a selected recess, and a spring engaging said carrier and movable therewith for yieldably holding said pin in a selected recess.

LEWIS WALTERS.